United States Patent [19]

Ahn et al.

[11] Patent Number: 5,643,635

[45] Date of Patent: Jul. 1, 1997

[54] METHOD AND COMPOSITION FOR FORMING A DECORATIVE COATING ON A SUBSTRATE

[75] Inventors: Chung-Il Ahn, Inchon; Chan-Hee Shin, 451-9, Hwagok-dong, Kangseo-ku, Seoul (157-010), both of Rep. of Korea

[73] Assignee: Chan-Hee Shin, Seoul, Rep. of Korea

[21] Appl. No.: 389,416

[22] Filed: Feb. 16, 1995

[30] Foreign Application Priority Data

Feb. 16, 1994 [KR] Rep. of Korea ............... 1995-283

[51] Int. Cl.$^6$ ..................... B05D 5/06; B05D 3/02
[52] U.S. Cl. ............... 427/257; 427/287; 427/385.5; 427/379
[58] Field of Search ................. 427/257, 287, 427/385.5, 379, 421, 428; 428/152, 155, 913.3, 542.2

[56] References Cited

U.S. PATENT DOCUMENTS

| | | | |
|---|---|---|---|
| 3,872,044 | 3/1975 | Hervey et al. | 524/169 |
| 4,017,493 | 4/1977 | Ferment et al. | 427/257 |
| 4,247,666 | 1/1981 | Mochizuki | 525/528 |
| 4,383,076 | 5/1983 | Wolf et al. | 524/589 |
| 4,473,601 | 9/1984 | Kanatsu et al. | 427/453 |
| 4,533,703 | 8/1985 | Kordomenos et al. | 525/440 |
| 4,761,212 | 8/1988 | Watanabe et al. | 204/181.1 |
| 5,118,372 | 6/1992 | Spahn | 156/160 |

OTHER PUBLICATIONS

Kirk–Othmer "Encyclopedia of Chemical Technology", Third Edition, vol. 6, pp. 388–389, 1979.

Primary Examiner—Shrive Beck
Assistant Examiner—Fred J. Parker
Attorney, Agent, or Firm—Richard C. Litman

[57] ABSTRACT

An ink composition and method of printing naturally formed patterns on the surface of various materials, such as paper, glass, ceramic, metal or plastics. The printing method uses a coating liquid of a composition comprising a principal component and a hardener component, applying the component system to a surface through the use of any of a plurality of application methods, and drying the applied surface in two stages which includes a primary drying stage, partly at room temperature, and a forced air drying stage, at elevated temperatures. The process results in a decorative lightly textured surface of a crackled appearance. The principal component of the coating composition consists of a polyol resin, ethylene glycol acetate, ethyl acetate, toluene, filler and pigment. The hardener component consists of blocked isocyanate, ethyl acetate and toluene. The method of the present invention includes mixing of the principal component with the hardener component so that, during the coating and drying stages, the polyol resin reacts with the blocked isocyanate while part of the solvent and blocked isocyanate is volatilized from the coated surface layer of the coating liquid. Natural patterns are formed on the surface of coating materials during hardening as hardening is delayed in the inner layer of the coating liquid while the surface layer shrinks.

3 Claims, No Drawings

METHOD AND COMPOSITION FOR FORMING A DECORATIVE COATING ON A SUBSTRATE

BACKGROUND OF THE INVENTION

1. Field of the Invention

The present invention relates to a composition of ink and method of printing natural patterns on the surface of various materials. More particularly, the invention pertains to a printing process and ink composition for creating beautiful and durable natural patterns on a flat or round surface of materials such as paper, glass, ceramic, metal or plastics.

2. Description of the Prior Art

Surface coatings and coating processes which involve reacting a component resin with a component acid are generally known in the prior art. U.S. Pat. No. 3,872,044 issued Mar. 18, 1975, to Hervey et al. describes a thermoplastic fast-set ink for application by a screening process. The ink includes a polyamide resin formed by reacting a dicarboxylic acid and a linear diamine in an alcohol of a boiling point range of 110° C. to 175° C. The alcohol can be diluted up with a 2:1 weight ratio to a solvent such as toluene.

U.S. Pat. No. 4,533,703 issued Aug. 6, 1985, to Kordomenos et al. describes a composition for flexible basecoat and clearcoat layers for automobile coating systems using urethane modified polyesters. The clearcoat is formed by reacting diols with diisocyantes at generally elevated temperatures to create a urethane modified diol. The basecoat is formed by first combining the diols with an acid component reactant at generally elevated temperatures to create a hydroxy functional polyester, which is then modified by reaction with a diisocyanate in the presence of toluene.

U.S. Pat. No. 5,118,372 issued Jun. 2, 1992, to Spahn describes a method of forming a decorative sheet material on a substrate by layering paint and clear coats using a two component system of polyesters and polyurethanes in the presence of solvents such as toluene. Reflective metallic flakes such as aluminum and zinc are included in the composition. The applied clear coat is dried at temperatures of 25° to 100° C. The decorative appearance is formed by mechanically cracking the coats.

U.S. Pat. No. 4,017,493 issued Apr. 12, 1977, to Ferment et al. describes a coating process for creating a textured polyurethane surface by first forming a smooth, uncured polyurethane coating on the substrate and then heating it to temperatures of 100° C. to 160° C. for 1 to 10 minutes followed by another heating at temperatures from 170° C. to 210° C. for 0.5 to 10 minutes.

U.S. Pat. No. 4,473,601 issued Sep. 25, 1984, to Kanatsu et al. describes a method of producing a variegated coating by applying a synthetic emulsion coating, partially drying the coat, and then using a high boiling solvent for softening the emulsion during a polishing step.

Existing technologies relating to methods of printing patterns on the surface of materials are also described in foreign patent literature. For instance, Patent Announcement 91-2529, Republic of Korea defines a method for printing glossy patterns on materials through making negative patterns on the surface by applying a screen printing paste, heating it above 400° C., forming glossy patterns on the uncoated surface by placing the heated materials having negative patterns in an oxidized metal solution which reacts with the uncoated surfaces, and then removing the negative patterns from the material.

Also, Japanese Patent Announcement Nos. 52-41682 and 57-50547 by Sohwa describe methods of printing patterns on various materials with printed (coated) transfer films.

However, each of the existing technologies as set forth in the prior art involve certain weaknesses; for example, the prior art processes are complicated, substrate material selection is limited, colors are not permanent or fade easily, patterns must be artificially applied to the surface materials or be applied by use of transfer films before printing, and final printing costs are high. In order to solve these technical problems, a new natural pattern printing method is needed wherein the coating process is simple, not limited by a substrate choice, and the coating is highly durable and provide a quality product.

None of the above inventions and patents, taken either singly or in combination, is seen to describe the instant invention as claimed.

SUMMARY OF THE INVENTION

The present invention relates to a composition of ink and method of printing naturally formed patterns on the surface of various materials, such as paper, glass, ceramic, metal or plastics. The present printing method uses a liquid coating composition comprising a principal component and a hardener component, applying the component system to a surface through the use of any of a plurality of application methods, and drying the applied surface in two stages which include a primary drying stage, partly at room temperature, and a forced air drying stage, at elevated temperatures. The process results in a decorative lightly textured surface of a crackled appearance.

The principal component of the coating composition consists of a polyol resin, ethylene glycol acetate, ethyl acetate, toluene, filler and pigment. The hardener component consists of blocked isocyanate, ethyl acetate and toluene. Polyol resins which may be used include polyester resin, acryl resin, flourine resin, alkyd resin, polyether resin or epoxy resin which have hydroxyl groups on each end. Fillers used may include oxidized antimony (III) or aluminum hydroxides.

The process of the present invention includes mixing of the principal component with the hardener component so that, during the coating and drying stages, the polyol resin reacts with the blocked isocyanate while part of the solvent and blocked isocyanate is volatilized from the coated surface layer of the coating liquid. Natural patterns are formed on the surface of coating materials during hardening as hardening is delayed in the inner layer of the coating liquid while the surface layer shrinks.

Accordingly, it is a principal object of the invention to provide a simple and high quality method for printing naturally formed patterns on various materials.

It is another object of the invention to provide a novel composition of a two-component surface coating for use in multiple decorative surface coating methods.

It is a further object of the invention to provide a method for printing naturally formed patterns which are durable.

Still another object of the invention is to provide a printing method and surface coating which is inexpensive to use.

These and other objects of the present invention will become readily apparent upon further review of the following specification.

DETAILED DESCRIPTION OF THE PREFERRED EMBODIMENTS

The present invention relates to a two-component coating composition and a method of printing resulting in naturally formed patterns on the surface of various materials. More particularly, the printing process and ink composition of the present invention can be used to create beautiful and durable natural patterns on the flat or round surface of materials such as paper, glass, ceramic, metal or plastics. Various methods of applying the coating, such as screen printing, spray coating, roller coating and deposition coating, can be used with the coating composition and process. The method used with each of the various applications types is described below.

The principal component of the coating composition consists 10–90% by volume of a polyol resin, ethylene glycol acetate 3–30%, ethyl acetate 4–35%, toluene 2–20%, filler 1–2% and pigment 0.01–3%. The ratios of the various ingredients of the principal component can be adjusted according to the materials to be coated and coating method within the ranges indicated. The ranges represent the relative ratios of the ingredients by volume. The hardener component consists of 70–80% by volume of a blocked isocyanate, ethyl acetate 10–15% and toluene 10–15%. The ingredients of the principal component and hardener may be mixed in accordance with the coating method to be used. Polyol resins which may be used include polyester resin, acryl resin, fluorine resin, alkyd resin, polyether resin or epoxy resin which have hydroxyl end groups. Fillers used may include oxidized antimony (III) or aluminum hydroxides. Also, organic pigments such as antraquinone dyes, phthal-cyanine dyes, etc. or inorganic pigments such as zinc white, chrome yellow, molybdate orange, ultramarine, cobalt green, carbon black may be used depending on the colors of natural patterns desired. In addition, the blocked isocyanate, an ingredient of the hardener component, is made by masking a polyisocyanate with a blocking agent which may be a condensate of toluene-2,4-diisocyanate (TDI). Toluene-2,6-diisocyanate or methylene bis (4-phenyl isocyanate) (MDI) with blocking agent, and liquid compound with properties of solid 80– 100%, effective isocyanate density 9–10% and boiling point 50°–200° C. may also used.

The composition is then used with one of the following application methods.

I. The screen printing method involves the following steps.

1. Coating composition mixing process: Mix the principal component with the hardener component at a bulk ratio (volume/volume) of 1:2 to 2:1 and make sure that it is sufficiently mixed. If it is not mixed sufficiently, natural patterns will appear uneven; if the mix ratio exceeds 2:1, then natural patterns are not manifested.

2. Coating Process: Use 150–250 mesh (printing sieve) to get a proper coating thickness. Apply the coating liquid onto the substrate so as to achieve a coating thickness of greater than 0.005 mm before the drying process is started and resulting in greater than 0.002 mm thickness after the drying process is complete. While applying the coating, it is desirable to apply a coat as thick as possible and to use a squeegee of a greater than average hardness. If the coating thickness is less than the above, natural patterns will not be manifested.

3. Drying Process: The drying process consists of a primary drying stage and a forced drying stage.

The primary stage functions to volatilize the solvent and to prevent uneven natural patterns caused by solvent remaining during the forced drying stage. During the primary drying process, the coated material is left at room or ambient temperatures for 5 to 10 minutes or more.

Upon completion of the primary drying stage, initially dried materials pass through a forced drying process which dries at temperatures from 90°–150° C. for 2–20 minutes. The duration and temperature at which materials are dried are dependent upon the type of dryer and amount of air circulation found inside the dryer. It is especially important to remove the solvent from the dryer by ventilating well and circulating fresh air. If proper temperature and air circulation inside the dryer and resulting solvent gas ventilation are not achieved, natural patterns form with difficultly.

After completing the forced dry process, natural patterns will be formed on the coating surface.

II. The spray coating method involves the following steps.

1. Coating composition mixing process: The same process is used as described above in Section 1.1. for screen printing. If necessary, a minute amount of diluted thinner can be added to the coating composition; however, it is desirable to use coating liquid unmodified.

2. Coating process: To achieve proper coating thickness, the coating composition is applied to the surface of the substrate in a thickness of greater than 0.1–0.4 mm before the drying process is started and resulting in a thickness of 0.1–0.2 mm after the drying process is complete. If the coating thickness is applied in a thickness of less than the above, natural patterns are not manifested. While applying the coating liquid, spray pressure of 40–50 psi is desirable. One spray application is usually applied when printing on a flat surface, but 2 or 3 spray applications may be needed on round surfaces. Also, control of the number of spray applications depend upon the surface type of the materials and the density of the coating composition liquid.

For example, when applied to glass, or especially if waterproofing is required, the primer coat is sprayed thinly on the glass, then heated and dried at 120°–130° C. for 5–10 minutes. The primer coat improves adhesion between the surface of materials and the coating composition liquid. A second spray application of the coating composition liquid is applied. In contrast, when applied to metal, it is not necessary to spray a primer coat.

3. Drying process: The drying process for spray coating is the same as that for screen printing; however, due to an increased use of solvent to accommodate the spraying process, the coated materials are left at room temperature for 10 to 30 minutes to sufficiently volatilize the solvent. It is especially desirable to circulate air and ventilate the gas well so that no volatile ingredients are left inside the dryer.

III. The roller coating method is the same as that of spray coating except that a roller instead of a sprayer is used.

IV. The deposition coating is the same as that of spray coating except that general deposition coating method is used.

After completion of the application of the coating composition to a substrate, the coating quality is inspected. The surface of the printed materials is inspected with 10× magnifier to check whether natural patterns have been formed.

The invention is explained in further detail by the examples which follow. The following examples are intended to illustrate the invention and should not be construed as imposing limitations on the claims.

EXAMPLE 1

The liquid composition was made by sufficiently mixing the principal component, comprising polyol resin (Nippolan™ 800, Nippon Polyurethane Industry Co., Ltd.) 70%, ethylene glycol acetate 10%, ethyl acetate 10%, toluene 7%, aluminum hydroxide 2%, and zinc oxide 1%, with the hardener component, comprising blocked isocyanate (Coronate™ 2507, Nippon Polyurethane Industry Co., Ltd.) 75%, ethyl acetate 10%, toluene 15% at a 1:1 bulk ratio. With a squeegee of middle hardness, the coating composition liquid was applied in a layer as thick as 0.005 mm to the surface of 0.5 mm thick packing paper, and the material was left at room temperature once and then 7 more minutes. After the primary drying stage was completed, the initially dried product was then heated and dried at 90° C. for 2 minutes. An end product was so obtained. The coating thickness was 0.003 mm when measured. Also, when the surface of the end product was inspected with a 10× magnifier, natural patterns ("ice flowers") were seen to have appeared, similar to smooth mountains and dales one next to the other.

EXAMPLE 2

The end product was made with the same method as that used in Example 1, except that 0.2 mm thick iron plate was used as a substrate. The materials were heated and dried at 120° C. for 7 minutes in the dryer. Natural patterns ("ice flowers") were formed.

EXAMPLE 3

The end product was made with the same method as that of Example 1, except that 7 mm thick glass was used as a substrate. The material was heated and dried at 120° C. for 7 minutes in the dryer. Natural patterns ("ice flowers") were formed.

EXAMPLE 4

The coating composition liquid was made by mixing the principal component, comprising polyol resin (Nippolan™ 800, Nippon Polyurethane Industry Co., Ltd.) 50%, ethylene glycol. acetate 20%, ethyl acetate 13%, toluene 15%, aluminum hydroxides 1%, and zinc oxide 1%, with the hardener component, comprising blocked isocyanate (Coronate™ 2507, Nippon Polyurethane Industry Co., Ltd.) 70%, ethyl acetate 15% and toluene 15%, at a 1:1 bulk ratio and agitating sufficiently with an agitator. The coating composition liquid was applied by spraying at 45 psi of pressure once over the surface of 0.5 mm thick packing paper forming a layer as thick as 0.5 mm. The product was left at room temperature once and 20 more minutes. The end product was obtained by heating and drying the initially dried product at 90° C. for 6 minutes in the dryer. The end coating was 0.25 mm in thickness and when the surface of the end coating was inspected with a 10× magnifier, natural patterns ("ice flowers") had appeared.

EXAMPLE 5

The end product was made with the same method as that used in Example 4, except that 0.2 mm thick iron plate was used as a substrate. The materials were heated and dried at 120° C. for 7 minutes in the dryer. Natural patterns ("ice flowers") were formed.

EXAMPLE 6

The end product was made with the same method as that used in Example 4, except that 5 mm thick rounded glass was used as a substrate. The materials were heated and dried at 115° C. or 20 minutes in the dryer. Natural patterns ("ice flowers") were formed.

As discussed above, the present invention results in a decorative product which can add value and increase quality without limitation of substrate selection. Durable and high quality natural patterns such as ice flowers can be simply and inexpensively printed on the substrate materials.

It is to be understood that the present invention is not limited to the sole embodiment described above, but encompasses any and all embodiments within the scope of the following claims.

We claim:

1. A method of preparing a decorative surface coating on a substrate comprising:

mixing a principle component and a hardener component in a bulk ratio from 1:2 (v/v) to 2:1 (v/v) to form a liquid coating composition, said principle component consisting of 10–90% by volume of a polyol resin, 3–30% by volume of ethylene glycol acetate, 4–35% by volume of ethyl acetate, 2–20% by volume of toluene, 1–2% by volume of a filler, and 0.01–3% by volume of a pigment, said hardener component consisting of 70–80% by volume of a blocked isocyanate, 10–15% by volume of ethyl acetate, and 10–15% by volume of toluene;

applying said liquid coating composition to a surface of a substrate to form a coated product; and, drying said coated product in a primary drying stage at ambient temperatures followed by a forced drying stage at elevated temperatures to obtain an end product having a decorative textured surface of a patterned appearance.

2. The method according to claim 1, wherein said liquid coating composition is applied by a coating process selected from the group consisting of screen printing, spray coating, and roller coating.

3. The method according to claim 1, wherein the forced drying stage is conducted at elevated temperatures from 90° to 150° C. for 2 to 20 minutes.

* * * * *